United States Patent [19]
Orosz

[11] Patent Number: 5,905,951
[45] Date of Patent: May 18, 1999

[54] REMOTE OFFICE ADMINISTRATIVE AND MAINTENANCE SYSTEM FOR CELL SITES IN A WIRELESS TELECOMMUNICATION NETWORK

[75] Inventor: William John Orosz, Aurora, Ill.

[73] Assignee: Lucent Technologies Inc., Murray Hill, N.J.

[21] Appl. No.: 08/745,142

[22] Filed: Nov. 7, 1996

[51] Int. Cl.$^6$ .......................... H04M 1/24; H04M 11/00; H04B 17/00
[52] U.S. Cl. ........................ 455/423; 455/67.1; 455/553; 455/557
[58] Field of Search ..................................... 455/422, 423, 455/424, 426, 9, 507, 508, 67.1, 553, 557, 562; 379/339

[56] References Cited

U.S. PATENT DOCUMENTS

| | | | |
|---|---|---|---|
| 5,361,402 | 11/1994 | Grube et al. ............................. | 455/67.1 |
| 5,479,480 | 12/1995 | Scott ....................................... | 455/553 |
| 5,526,398 | 6/1996 | Okada et al. ............................ | 455/426 |
| 5,703,929 | 12/1997 | Schillaci et al. ......................... | 455/423 |
| 5,710,986 | 1/1998 | Obayashi et al. ........................ | 455/553 |
| 5,793,799 | 8/1998 | Armbruster et al. .................... | 455/553 |
| 5,794,159 | 8/1998 | Portin ...................................... | 455/553 |

*Primary Examiner*—Willis R. Wolfe
*Attorney, Agent, or Firm*—Michael B. Johannesen

[57] ABSTRACT

A system for providing a wireless connection from a cell site to its own operations and maintenance panel (OMP). A new unit is built into a cell site on the radio shelf that includes features of a cellular telephone. Such unit includes a modem so that a laptop or other type of computer may be plugged in. This system operates in a plurality of modes, so that it can communicate with any or all of the wireless telecommunication system types (such as AMPS, TDMA, CDMA), and frequency ranges (i.e, 850 MHz and microwave). While the system is installation, the wireless telephone unit can communicate with another type of wireless system. However, once the system comes on line, the unit can communicate with other cell sites in the area from its own system, thus reducing the cost of maintenance. Furthermore, such a system can be used for informing the OMP of alarms such as an intruder alarm, etc. Advantageously, after installation, emergency telephone service or other directly connected telephone service, may be provided by this system.

7 Claims, 4 Drawing Sheets

5,905,951

REMOTE OFFICE ADMINISTRATIVE AND MAINTENANCE SYSTEM FOR CELL SITES IN A WIRELESS TELECOMMUNICATION NETWORK

TECHNICAL FIELD

This invention relates to the area of wireless telecommunications, and, more specifically, to an apparatus to aid in installation and maintenance of cell sites in such wireless communication networks.

BACKGROUND OF THE INVENTION

Recently, there has been an exponential growth in consumer use of wireless telecommunication systems. To meet such consumer demand, telephone operating companies that provide wireless telecommunication services are installing and upgrading their physical plant at a rate rarely seen in telecommunications history. Furthermore, regions or countries that do not have a wire-line telecommunication system infrastructure are "leapfrogging" technology, by moving directly into wireless telecommunications which can provide a wider area of service coverage with less capital investment.

It is known in the art, however, that installation and maintenance of a cell site in wireless telecommunication systems is an expensive proposition. Turning now to FIG. 1, a typical scenario of an installation and maintenance of a cell site is shown. In this scenario, there is a personal communication system (PCS) 102 being installed in an area that is currently served by an AMPS analog system 104, as is known in the art. This installation scenario occurs, for example, in urban areas where such AMPS systems as 104 are overloaded and there are delays in receiving service. A PCS system, such as 102, can help relieve such congestion by providing service at different frequency spectrums or by providing digital service, again at various frequency spectrums.

As is known in the art, AMP system comprises a mobile switch center (APX-MSC) 106, connected to a plurality of cell sites 108. Each cell site is connected to an antenna 110. Cell sites 108-1 through 108-X are connected to mobile switching center (MSC) 106, via a plurality of trunks 112. Cell site 108-1 controls telecommunications among mobile units within the range of antenna 110 and connects such calls via trunk 112 to MSC 106. MSC 106 is connected via a plurality of trunks 114 to the public switch telephone network (PSTN) 116. PSTN 116 comprises a plurality of local, long distance, and tandem switches, as is known in the art.

In the scenario of FIG. 1, a personal communications service (PCS) 102 is being installed in the same general geographic location as AMPS system 104. PCS 102 comprises a PCS switching center (PCSC) 120, which provides a connection 121 to PSTN 116, switching, and other functionality similar to MSC 106. PSC 120 is connected to a plurality of cell sites 122. Each cell site is connected to an antenna 124, which, as in the prior art, facilitates communication with wireless telephones at preassigned frequencies.

In order to install, test, and maintain PCS cell sites, such as cell site 122-1, the installer must have access to the control system of PCSC 102, known as the operation maintenance panel (OMP) 126. The installer needs to be able to perform functions such as run diagnostics on various components, bring the cell site into and out of service, and perform other functions as known in the art.

In the prior art, cell site 122-1, as it is being installed, is connected to one or two telephone lines (POTS) 128 and 130, which connect cell site 122-1 to a local switch 132 of the local service provider. The installer can then plug in a telephone and/or a computer, such as a laptop computer (or both) to the telephone network, as is known in the art. Local switch 312 is connected to the public switch telephone network (PSTN) 116, which connects to a further local switch 134. Local switch 134 is connected to OMP 126 of the PCSC 120. The installer can then exercise the equipment by voice command to a person at OMP 126, or via remote control of the cell site through a PC. Hard wired connections, such as 128 and 130 are expensive and, in most cases, are permanent. Such wire-line connections require the PCS service provider to incur at least one, and usually two, line charges per cell. Thus, as more and more cell sites overlap, i.e., multiple service providers providing different frequency and different types (analog and digital) services, the higher the physical plant cost.

One partial solution to this problem is also illustrated in FIG. 1. A personal computer, for example a laptop 136, may be equipped with a cellular modem that operates with a currently existing analog (or digital) system that is already operating in that area. In this instance, signals from PC 136 are received at analog cell site 108-1, and are switched at APX-MSC 106 through PSTN 116 the local switch 134, and finally to OMP 126. While this system reduces the cost of physical plant and wires in the field, it incurs the additional cost of maintaining at least one cellular telephone number on analog system 106. Such maintenance of telephone numbers may be as costly, or more so, than a hard wire system, as described above.

Therefore, a problem in the art is that there is no low cost system for providing a connection from a cell site to its own operation and maintenance panel without incurring overhead expenses, possibly from competing service providers.

SUMMARY OF THE INVENTION

This problem is solved and a technical advance is achieved in the art by a system and method for providing a wireless connection from a cell site to its own operations and maintenance panel (OMP). A new unit is built into a cell site on the radio shelf that includes features of a cellular telephone. This system operates in a plurality of modes, so that it can communicate with any or all of the wireless telecommunication system types (such as AMPS, TDMA, CDMA), and frequency ranges (i.e, 850 MHz and microwave). While the system is installation, the wireless telephone unit can communicate with another type of wireless system. However, once the system comes on line, the unit can communicate with other cell sites in the area from its own system, thus reducing the cost of maintenance. Furthermore, such a system can be used for informing the OMP of alarms such as an intruder alarm, etc. Advantageously, after installation, emergency telephone service or other directly connected telephone service, may be provided by this system.

BRIEF DESCRIPTION OF THE DRAWING

A more complete understanding of the invention may be obtained from the consideration of the following description in conjunction with the drawings in which.

DETAILED DESCRIPTION

Figure 1:
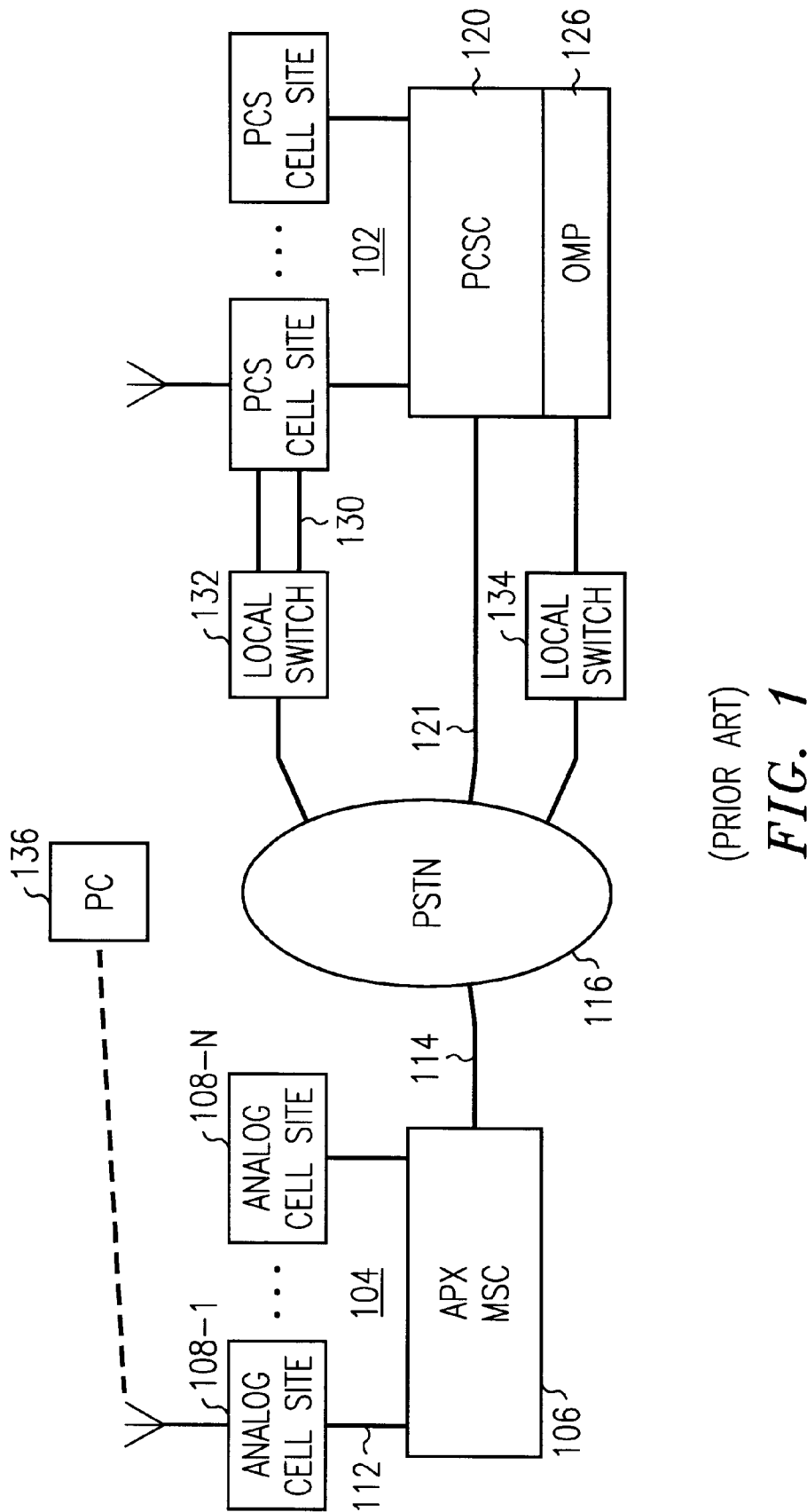
FIG. 1 is a block diagram of the prior art configuration of maintenance of cell sites.
Figure 2:
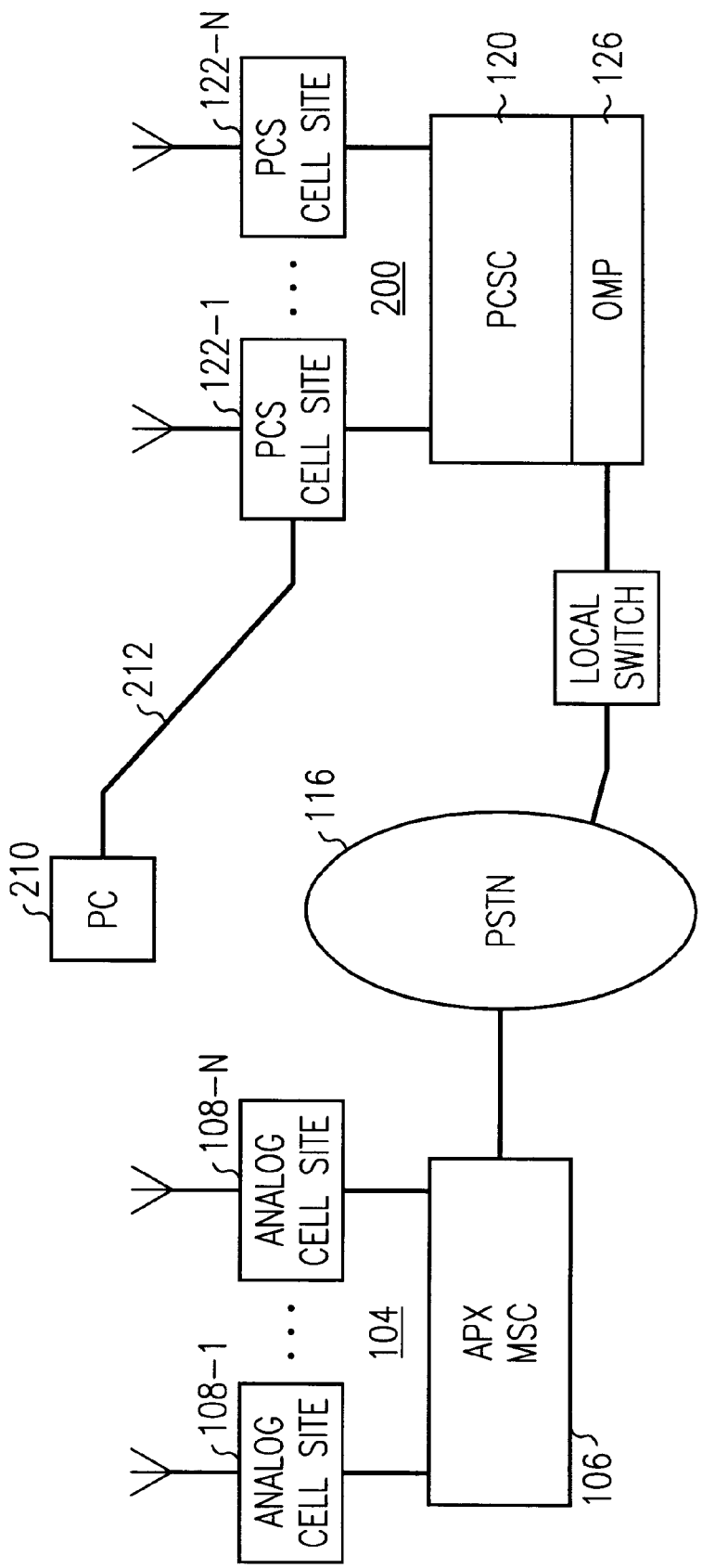
FIG. 2 is a block diagram of the current invention of two cellular systems using the current invention.

FIG. 2 illustrates a block diagram in which an exemplary embodiment of this invention is practiced. FIG. 2 illustrates an analog wireless system 100, comprising an APX-MSC 106 and cell sites 108-1 through 108-N as described previously in accordance with FIG. 1. 200 illustrates a PCS system comprising PCSC 120, PCS cell sites 122 and OMP 126. PCS system 200 is, according to this exemplary embodiment, being installed. As stated above, in the prior art, telephone lines normally would be strung from a local switching system to each PCS cell site in order to facilitate craft installation of the cell site. Alternatively, a PC such as 210 requires a wireless modem and a permanent presence on analog system 104 According to this invention, neither a wire-line connection nor a permanent presence in the analog system is required. According to this invention, PC 210 connected to cell site 122-1, for example, via a standard interface connection 212. PC 210 is connected to a remote OA&M wireless telephone, according to this invention, incorporated in cell site 122-1. As will be discussed further below, wireless telephone according to this embodiment can communicate with analog system (PS system) 104. However, the wireless telephone does not have to have a permanent presence in AMPS system 104; it can have a temporary telephone number or even a roving presence in analog system 104. Then, when PCS system 200 goes on line (or one or more cell sites are in operation), PC 210 can communicate with OMP 126 via its own system, eliminating the need for and reliance on analog system 104. Thus, the advantages of this invention may be realized by an economical connection between the craft in the field and the OMP 126.

Figure 3:
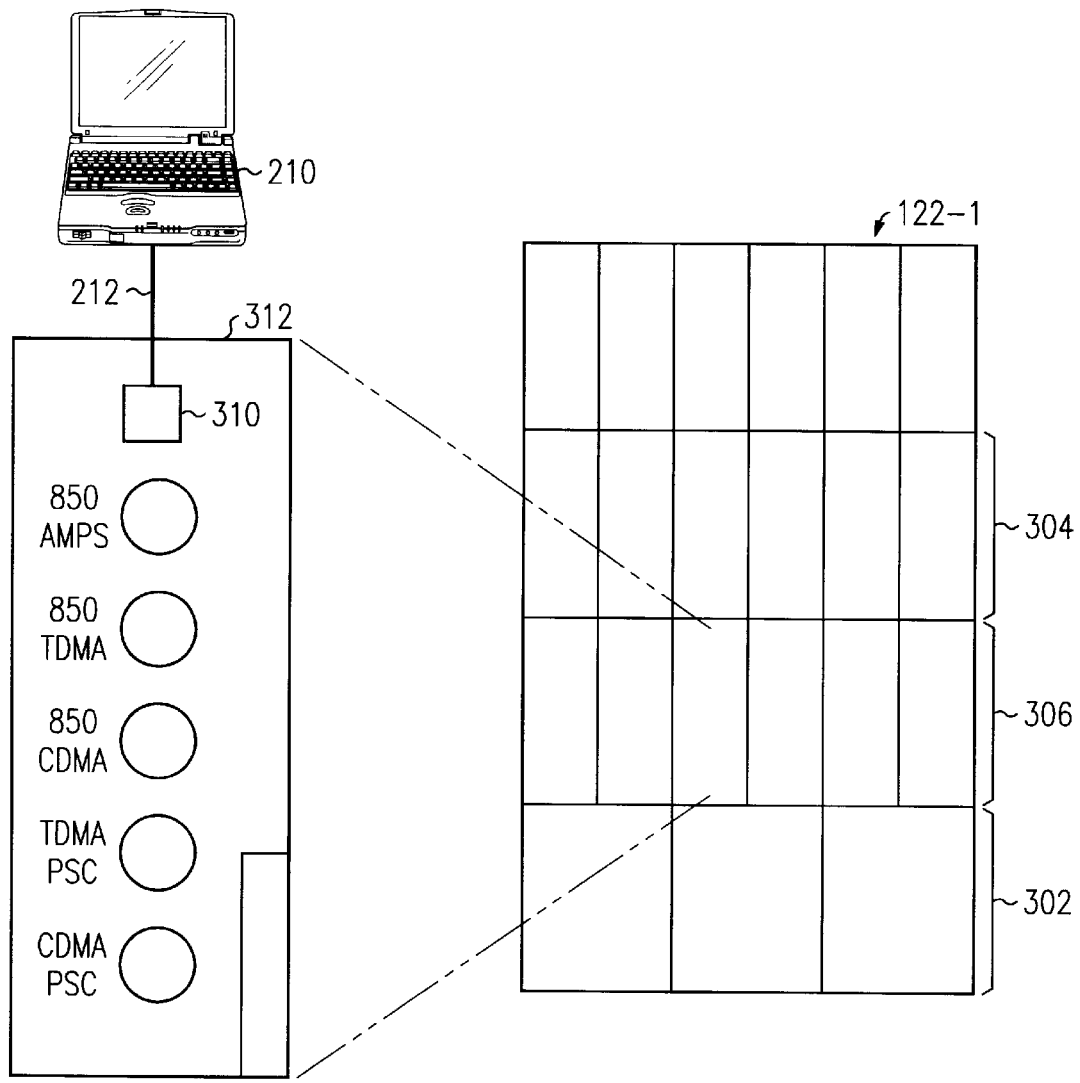
FIG. 3 is a diagram of the current invention in the context of a cell site of FIG. 2.

Turning now to FIG. 3, an exemplary embodiment of a one-card DA&M wireless telephone according to this invention in cell site 122-1 is shown. Cell site 122-1 comprises a frame with a plurality of shelves, each of which has a particular function; for example, power supply 302, trunk connections 304 between the cell site and PCSC 120, and radios 306 for communicating with wireless telephones. On the same shelf with the wireless radios 306, and, drawing power from the same power source, is a wireless OA&M telephone 312, according to an exemplary embodiment of this invention. As illustrated in FTG. 3, laptop computer 210 is connected via cable 212 to jack 310 of wireless telephone 312. According to this invention, this wireless radio may operate on a plurality of channels, for example, 850 MHz AMPS, 850 MHz time division multiple access (TDMA), 850 MHz CDMA, TDMA PCS, and CDMA PCS, as are all known and described in the art. Such multi channel radios are described in Scott, U.S. Pat. No. 5,479,480, which is assigned to the assignee of this invention and incorporated by reference. According to this embodiment of this invention, when a connection is desired, telephone 312 may try a preprogrammed sequence of system to try and establish a telephone connection. Alternatively, the user of laptop computer 210 may specify which type of communication to establish. In this manner, the best communication available to that cell site may be selected.

Figure 4:
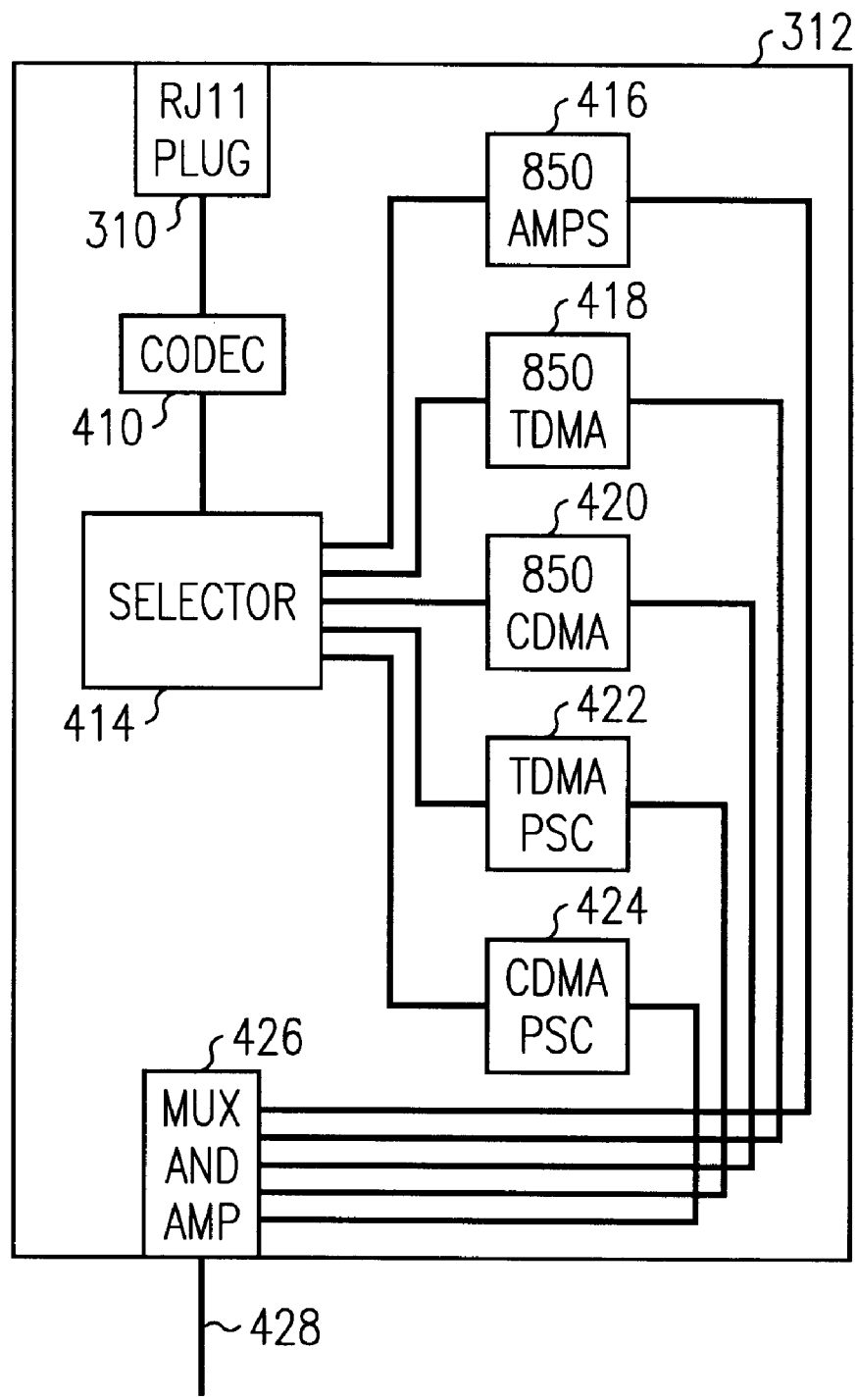
FIG. 4 is a block diagram of a remote office administration and maintenance system for a cell site in a wireless communications telephone network, according to this invention.

Turning now to FIG. 4, a block diagram of the wireless radio 312 of FIG. 3 is illustrated. Cellular telephone 312 comprises a plug 310 for interfacing a laptop computer such as 210 (FIG. 3). Plug 310 is connected to a CODEC 410 which provides standard telephone interface to the wireless telephone set. CODEC 410 is connected to selector 414 which selects among the various interfaces needed for the different air interfaces 416 through 424. All of the air interfaces are connected to a multiplexer and amplifier for receiving the different types of signaling which, in turn is connected to an antenna 428.

It is to be understood that the above-described embodiment is merely an illustrative principle of the invention and that many variations may be devised by those skilled in the art without departing from the scope of the invention. It is, therefore, intended that such variations be included within the scope of the claims.

The invention claimed is:

1. A wireless remote office maintenance and administration apparatus for use in installing and maintaining a wireless cell site, said apparatus comprising:

a plurality of wireless transceiver means, each communicating with a different type of wireless telephone;

a selector means for selecting one of said plurality of wireless transceiver means for a specific communication function; and multiplexor means for connecting said plurality of wireless transceiver means to an antenna.

2. A wireless remote office maintenance and administration apparatus according to claim 1 further including interface means for connecting a terminal to said apparatus.

3. A wireless remote office maintenance and administration apparatus according to claim 1 further including means for interfacing a telephone to said apparatus for voice communications.

4. A wireless remote office maintenance and administration apparatus according to claim 1 wherein said selector means includes means for automatically trying to establish a connection through each of said plurality of wireless transceiver means.

5. A wireless remote office maintenance and administration apparatus according to claim 1 wherein said antenna comprises an antenna at said cell site.

6. A wireless remote office maintenance and administration apparatus according to claim 1 wherein said antenna is separate from said cell site.

7. A wireless remote office maintenance and administration apparatus according to claim 2 wherein said selector means is responsive to a terminal for selecting which of said wireless transceivers to select.

* * * * *